United States Patent [19]

Yamanishi et al.

[11] Patent Number: 4,589,035
[45] Date of Patent: May 13, 1986

[54] MULTIPLE COPY IMAGE FORMING APPARATUS AND METHOD

[75] Inventors: Eiichi Yamanishi, Yokohama; Kenichi Oono, Kawasaki; Masami Gokita, Tokyo; Kenji Futaki, Kawasaki; Junji Watanabe, Yokohama, all of Japan

[73] Assignee: Kabushiki Kaisha Toshiba, Kawasaki, Japan

[21] Appl. No.: 632,220

[22] Filed: Jul. 18, 1984

[30] Foreign Application Priority Data

Jul. 29, 1983 [JP] Japan ................ 58-138825

[51] Int. Cl.⁴ .......... H04N 1/23; H04N 1/04; G03G 15/01; G01D 15/06
[52] U.S. Cl. .................. 358/296; 358/285; 358/300; 358/302; 346/157; 355/4
[58] Field of Search .......... 358/296, 300, 302, 78, 358/285, 75; 346/157; 355/4

[56] References Cited

U.S. PATENT DOCUMENTS

4,271,431 6/1981 Steber ................ 358/140

Primary Examiner—E. A. Goldberg
Assistant Examiner—Patrick W. Foster
Attorney, Agent, or Firm—Cushman, Darby & Cushman

[57] ABSTRACT

An image forming apparatus and method in which a scanner scans a document and prduces an image signal. The image signal is stored in a memory. Image formation and control are provided so that the first copy is produced from the scanner output and subsequent copies are produced from the signal stored in memory. For forming a color image, the image signal is converted into at least two color component signals. The full color copy is formed by superposing a plurality of single color images on each copy paper. The first single color image is produced from the scanner output and the subsequent single color images are produced from the color component signals stored in memory. Where more than one copy of color image is desired, the subsequent copies are all formed from single color images produced from the color component signals stored in memory.

18 Claims, 10 Drawing Figures

MULTIPLE COPY IMAGE FORMING APPARATUS AND METHOD

BACKGROUND OF THE INVENTION

The present invention relates to an image forming apparatus and method in which the image signal obtained by scanning the document is stored and then used to form an image of the document stored signal.

A thermal transfer type copying machine which makes a color copy of a document by using thermal transfer ink ribbons with a plurality of colors is known as an example of such an image forming apparatus. In the conventional apparatus, the document is read by an optical scanner, and the image signal obtained by scanning the document is converted to color component signals representing the color components equal to the colors on the ink ribbon. All the color component signals are stored in a memory and, then, read out sucessively for each color with the result that images of each color are superposed and thermally transferred onto a single copying paper so as to form a full color copy of the document. To reiterate, the entire image signal obtained by scanning the document is stored in a memory and, then, read out and transferred onto a copying paper in the conventional apparatus, leading to a slow copying operation. Where more than one copy of the document is to be made, the second copy et seq. can be formed from the color components stored in the memory. However, the time for obtaining the first full color copy is longer than the time for obtaining the second copy et seq. by the time required for scanning the document.

SUMMARY OF THE INVENTION

An object of the present invention is to provide an image forming apparatus and method which permits markedly shorter image forming time, particularly, with respect to the first copy, where a plurality of copies are formed.

According to the present invention, there is provided an image forming apparatus and method in which a scanner optically scans the document once reads out the image signal of the document, a memory stores the image signal generated from the scanner, an image forming section forms an image on an image forming medium based on the output signals of the scanner and the memory, and an image forming controlling section supplies the output signal of the scanner to the image forming section for the first image formation and supplies the output signal of the memory to the image forming section for the second image formation et seq.

In the apparatus and method of the present invention, an image signal is stored in the memory and a first image is formed on the image forming medium when the document is scanned. Also, the second image et seq. is formed on the basis of the stored signal in the memory. Thus, in the present invention, a plurality of picture images, particularly, the first picture image, can be formed efficiently.

DETAILED DESCRIPTION OF THE PREFERRED EMBODIMENT

Figure 1:
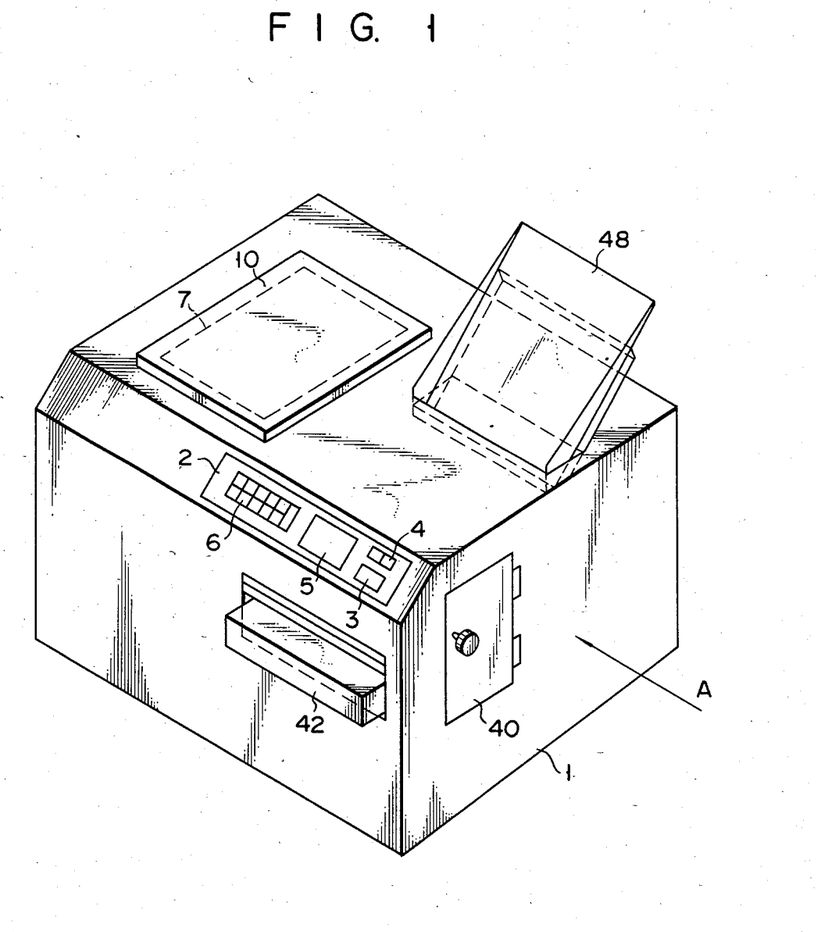
FIG. 1 is a perspective view showing the external view of a color copying machine of the thermal transfer type as the preferred embodiment of the image forming apparatus according to the present invention.
Figure 2:
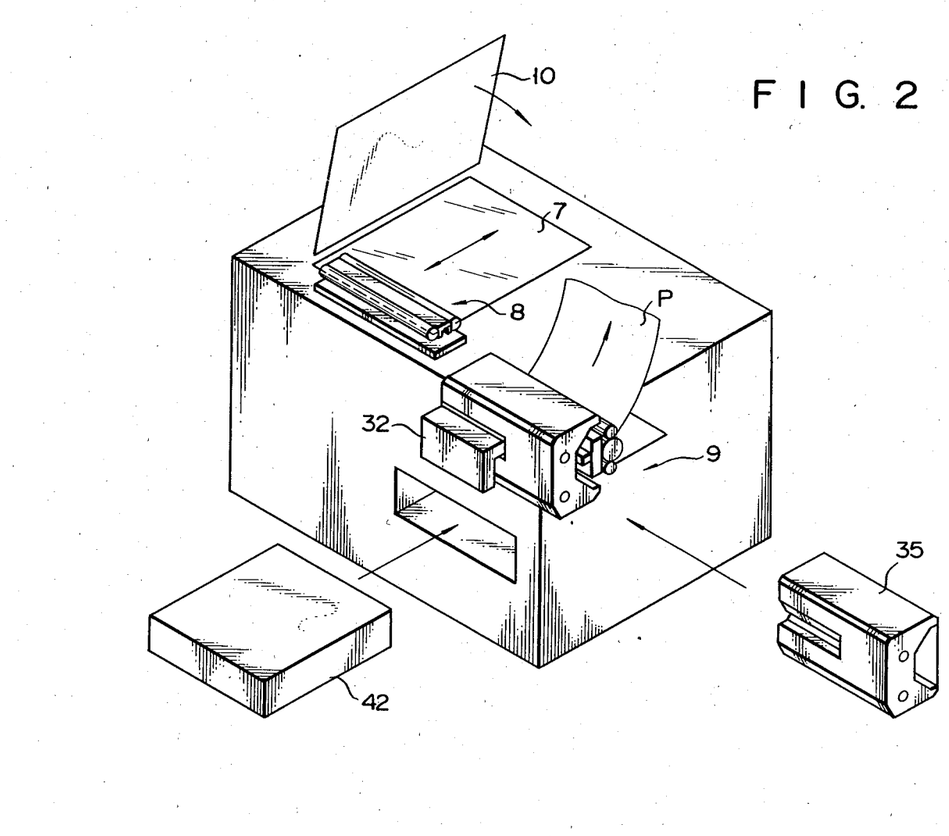
FIG. 2 is a perspective view of a copying machine according to the preferred embodiment of the present invention, showing several interior components.

One embodiment of the image forming apparatus according to the present invention, together with the method according to the present invention, will now be described with reference to the drawings. As the image forming apparatus, an example of the color copying machine of the thermal transfer type will be explained. FIG. 1 is a perspective view of this embodiment, and FIG. 2 is a view in which several of the internal components of FIG. 1 are seen. On the front side of the upper surface of a main body 1 of the copying machine, an operation panel 2 is provided and this panel 2 has a start key 3, a display 4 to indicate the number of desired copies, a mode indicator 5 to indicate the operation state, a ten-key pad 6 to set the number of desired copies, etc. A document table 7 made of a transparent glass and a document cover 10 are equipped on the left of the upper surface of the main body 1, while a copy discharge tray 48, onto which the copies are discharged after the copy has been completed, is equipped on the right. A scanner 8 to scan and read out the image signal of the document is provided below the document table 7 in the main body 1. An image forming section 9 to form an image in response to an output of the scanner 8 is equipped on the right in the main body 1.

Figure 3:
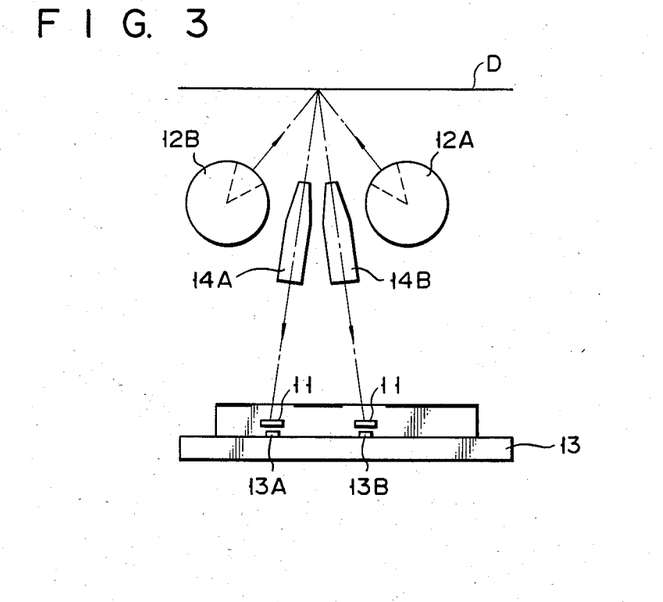
FIG. 3 is a cross sectional view showing a construction of the readout section in the scanner which is used in the preferred embodiment.
Figure 4:
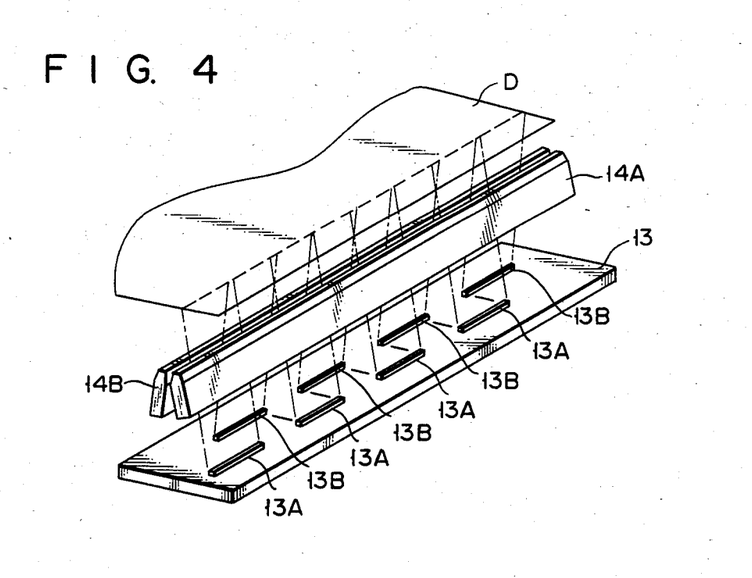
FIG. 4 is a perspective view showing the construction of the FIG. 3 readout section.
Figure 5:
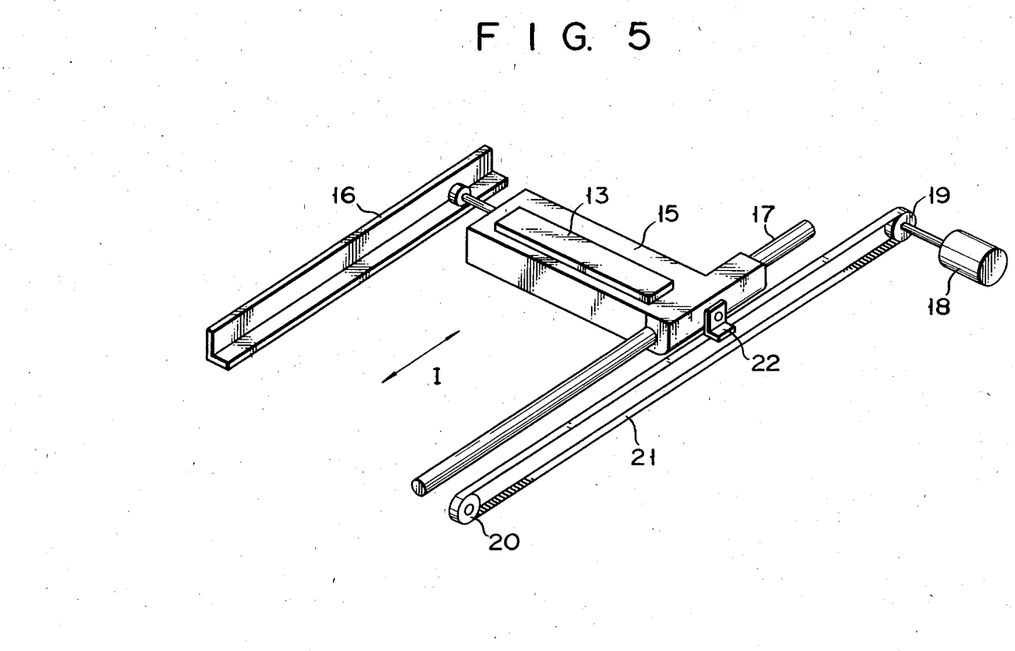
FIG. 5 is a perspective view showing the construction of the scanning mechanism of the scanner of the preferred embodiment.

The scanner 8 comprises a readout section shown in FIGS. 3 and 4 and a scanning mechanism shown in FIG. 5 which reciprocally moves the readout section along the document. FIG. 3 is a cross sectional view of the readout section and FIG. 4 is a perspective view thereof. The readout section comprises: exposing lamps 12A and 12B to obliquely illuminate one scanning line of a document D from both sides of the scanning line, a number of first and second photoelectric converters 13A and 13B to receive the light radiated from the exposing lamps 12A and 12B, respectively, and reflected by the scanning line of the document D, and optical systems (rod lenses) 14A and 14b to guide the reflected light to the photoelectric converters 13A and 13B. As shown in FIG. 4, the first and second photoelectric converters 13A and 13B are alternately arranged in parallel to one another and consist of, for example, CCD line image sensors or the like. Color filters 11 of Y (yellow), G (green) and C (cyan) are attached, like a mosaic for every pixel, to the first and second photoelectric converters 13A and 13B. Color filters of R (red), G (green) and B (blue) are most desirable for color reproduction. However, RGB color filters suitable for this copy machine are not manufactured. Therefore, YGC color filters are used.

The readout section is attached to the scanning mechanism, as shown in FIG. 5, which can be reciprocally moved along the lower surface of the document table 7 in the direction indicated by an arrow I, shown in FIG. 5. The base plate 13 of the readout section is fixed to a carriage 15. The carriage 15 is guided by a guide rail 16 and a guide bar 17 so that it can be freely reciprocally moved in the direction of the arrow I. An endless belt 21 is installed between a drive pulley 19 and a follower pulley 20 along the guide bar 17. The drive pulley 19 is connected to the drive shaft of a scanning motor 18 whose rotational direction can be reversed. A part of the endless belt 21 is fixedly connected to the carriage 15 through a fixing member 22. Thus, the carriage 15 is moved in the direction of the arrow I shown in association with the rotation of the scanning motor 18.

Figure 6:
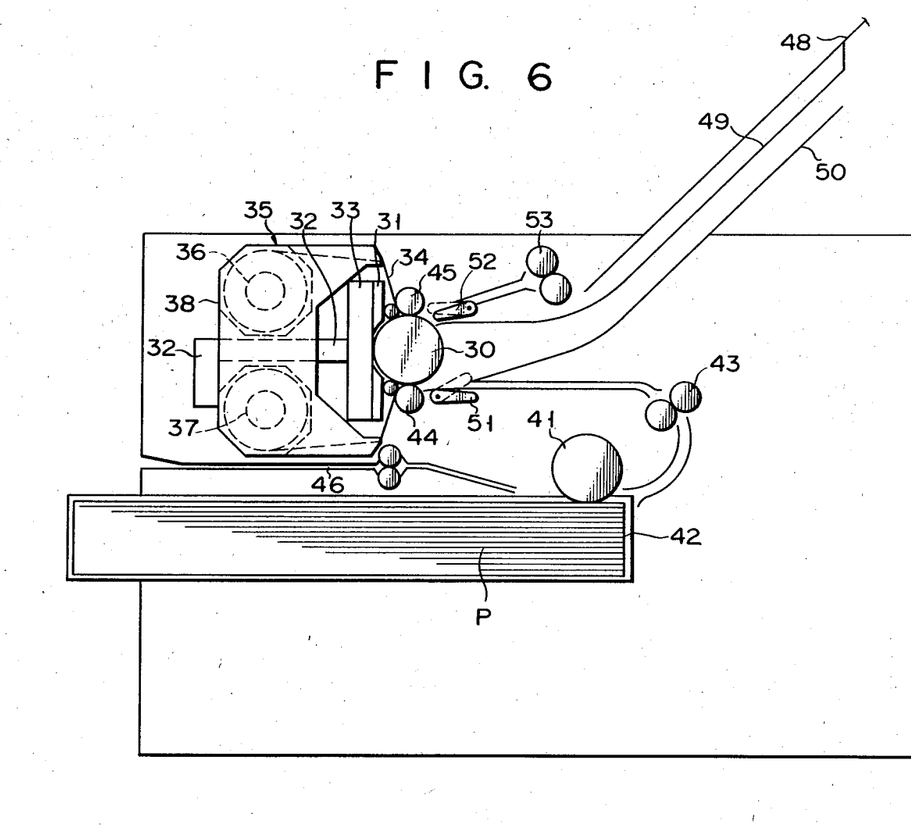
FIG. 6 is a cross sectional view showing the internal construction of the copying machine according to the preferred embodiment, as seen from the direction indicated by an arrow A of FIG. 1.

Next, the details of the image forming portion 9 will be explained with reference to FIG. 6. FIG. 6 is a cross sectional view showing the image forming section 9 as it is seen from the direction indicated by an arrow A in FIG. 1. A platen roller 30 is horizontally attached in substantially central portion of the image forming section 9. A thermal head 31 is located adjacent to the front side of the platen roller 30. The thermal head 31 is attached to a radiator 33 which is integrally formed on the rear end surface of a holder 32. As shown in FIG. 2, a ribbon cassette 35, which encloses a thermal transfer ink ribbon 34, is detachably installed in the holder 32 through an inserting/removing port provided on the right side of the main body 1. A lid 40, which can be freely opened and closed, is provided at the inserting-/removing port. When the ribbon cassette 35 is installed in the holder 32, the thermal transfer ink ribbon 34 is interposed between the thermal head 31 and the platen roller 30. The ribbon cassette 35 comprises a supply reel 36 and a take-up reel 37 to which both ends of the thermal transfer copying ink ribbon 34 are respectively connected, and a casing 38, a portion thereof being open so that the thermal transfer ink ribbon 34 may be interposed between the platen roller 30 and the thermal head 31. When the ribbon cassette 35 is installed in the main body 1, the supply reel 36 and the take-up reel 37 are coupled to the drive shaft of a motor (not shown) for carrying the ink ribbon through a driving force transferring mechanism (not shown) and are rotated and dependently driven.

A paper feed cassette 42, in which copy papers P are enclosed, is provided below the platen roller 30. The copy papers P in the paper feed cassette 42 are picked up one by one due to the rotation of a paper feed roller 41, provided beneath the platen roller 30, in the oblique direction on the right side of the cassette. The edge of each copy paper P thus picked up is aligned by a resist roller 43 provided above the paper feed roller 41 in the oblique direction on the right side of cassette 42. Thereafter, the copy paper P is carried toward the platen roller 30. Two pressing rollers 44 and 45 come into pressure contact with the platen roller 30, and the copy paper P is wrapped around the platen roller 30 by these pressing rollers 44 and 45, then paper P is accurately set in position and is carried by platen roller 30. When the copy paper P reaches a location between the thermal head 31 and the platen roller 30, the ink is transferred from the ink ribbon 34 onto the paper P due to the heat radiated from the thermal head 31, so that the copy paper P is printed. Thereafter, the copy paper P is discharged onto the copy discharge tray 48 through a paper discharge roller 53. Gates 51 and 52 are provided before and behind the pressing rollers 44 and 45, over the carrying passage for the copy paper P, so that the carrying passage is selectively shut and opened. The gate 51 doesn't shut the carrying passage when the paper is carried in the forward direction, but it wraps the paper onto the platen roller 30. On the other hand, when the paper is carried in the reverse direction, to perform the transfer and copy the second and subsequent color inks, the gate 51 shuts the carrying passage and guides the paper toward a first guide plate 50. Until the transfer and copy of all of the color inks are finished, the gate 52 shuts the carrying passage so that the paper is not carried to the copy discharge tray 48, thereby guiding the paper toward a second guide plate 49. After the transfer and copy of all of the color inks have been completed, the gate 52 opens the carrying passage and guides the paper to the copy discharge tray 48. The paper feed cassette 42 can be freely attached to and detached from the main body 1 from the front surface of the main body. In addition, in this embodiment, a manual feed section 46 is also provided on the front side of the main body 1 so that the copy papers can be supplied, one by one, by hand.

Figure 7:
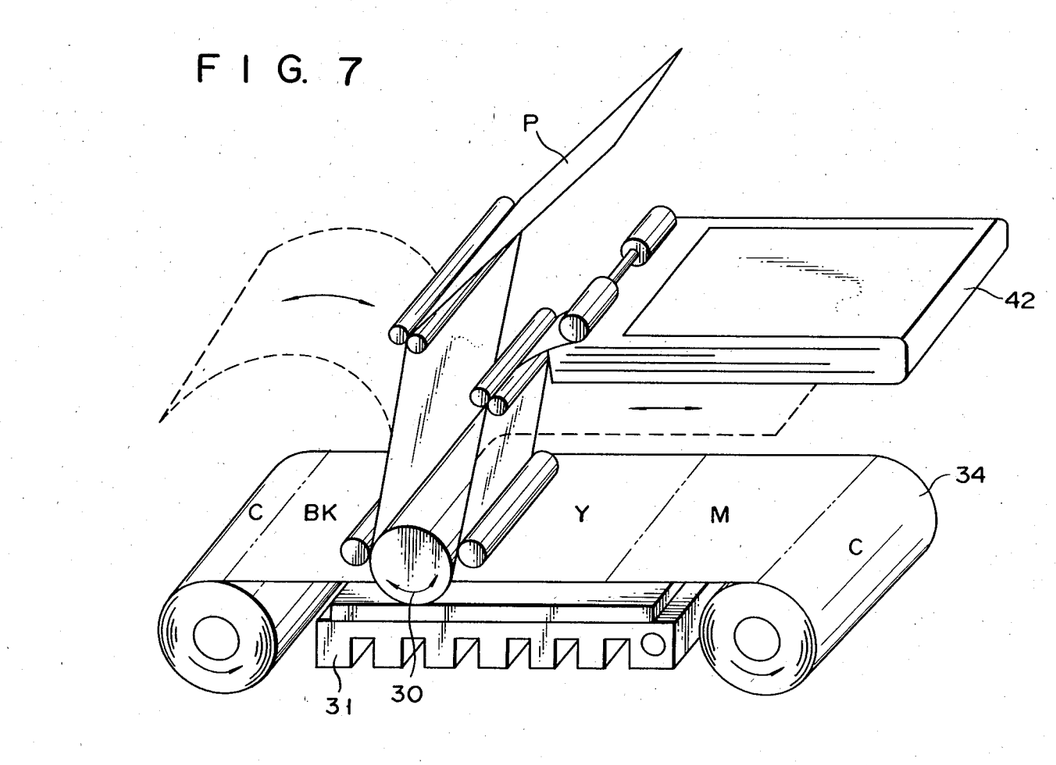
FIG. 7 is a diagram showing the method of the image formation of the present invention.

The copying method of the present invention will now be described with reference to FIG. 7. The thermal head 31 has an array of heating elements arranged in a line along the axial direction of the platen roller 30 at the contact surface with the platen roller 30. When the copy paper supplied from the paper feed cassette 42 is inserted between the platen roller 30 and the ink ribbon 34, the thermal head 31 presses the copy paper P onto the platen roller 30 through the ink ribbon 34, and at the same time, the heating element array is heated in accordance with the image signal. The ink, as the colorant on the ink ribbon 34, is melted and is thermally transferred on the copy paper P on a line by line basis. The lateral width of the ink ribbon 34 is equal to that of the copy paper (for this example, is assumed that the size of the copy paper P is only one kind). The ink regions of Y (yellow), M (magenta), C (cyan), and BK (black) are repeated on the ink ribbon 34 for every length which is substantially equal to (or slightly longer than) the longitudinal length of the copy paper P. The images of yellow, magenta, cyan, and black are formed to overlap on the copy paper P for every required color. After the formation of the images of all lines for each color has been completed, the copy paper is carried in the reverse direction, so that the first scanning line of the copy paper comes between the thermal head 31 and the platen roller 30. The ink ribbon 34 is slightly moved in the forward direction, so that the first portion of the ink region of the next color comes to the position of the thermal head 31.

Figure 8:
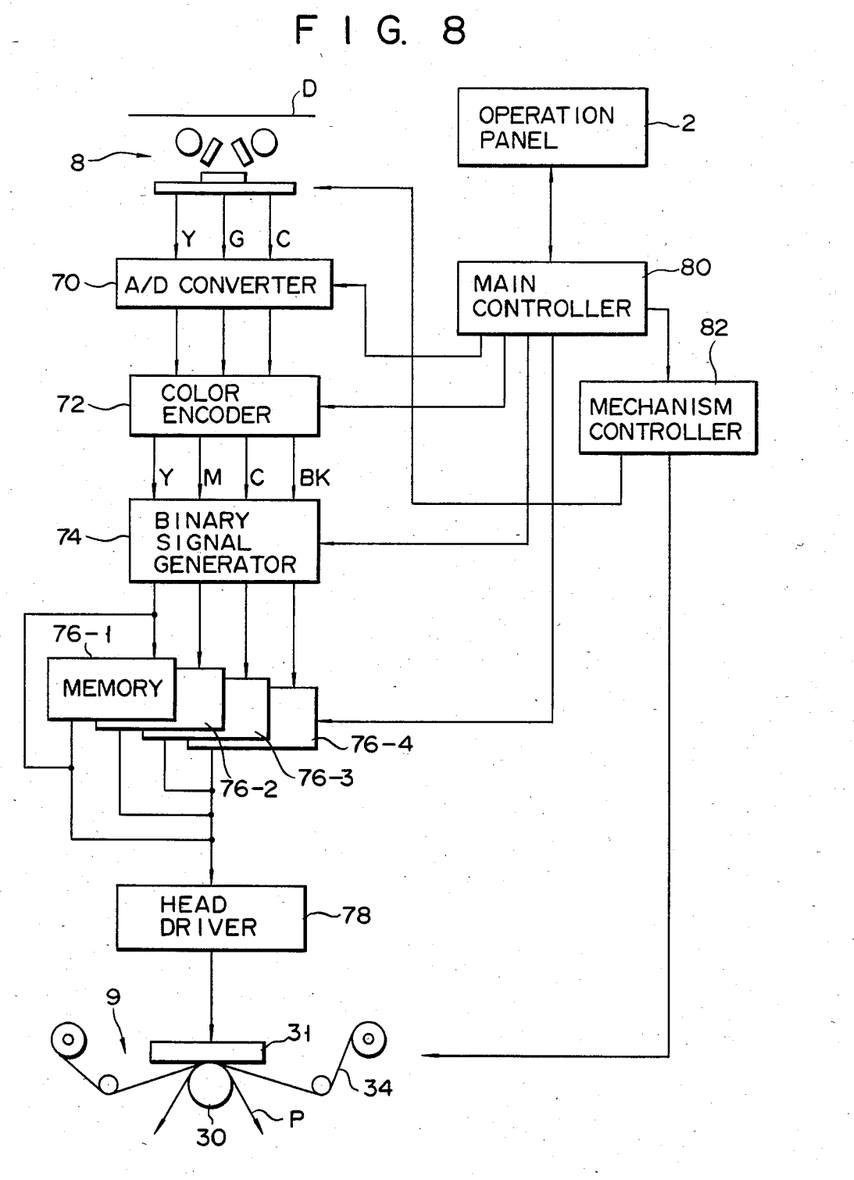
FIG. 8 is a block diagram of the control circuit of the preferred embodiment.

FIG. 8 shows a block diagram of the control circuit of this embodiment. The output color component signals Y, G and C of the scanner 8 are input to a color encoder 72 through an A/D converter 70. The color encoder 72 converts the output color component signals Y, G and C of the scanner 8 to the color component signals Y, M, C, and BK of four colors (the colors of the ink ribbon 34). The output color components Y and C of the encoder 72 are not completely identical to the output color components Y and C of the scanner 8. The output component signals Y, M, C, and BK of the color encoder 72 are supplied to a binary signal generator 74 and converted to binary coded signals. Namely, they are converted to on/off signals representing whether or not the heating elements of the thermal heads are heated.

The on-off signals of the component signals Y, M, C and BK are respectively stored in memories 76-1, 76-2, 76-3 and 76-4. The output of any one of these memories 76-1 to 76-4 is supplied via a head driver 78 to the image forming section, i.e., the thermal head 31. The signal component Y, which is supplied to the memory 76-1, is also supplied directly to the head driver 78. The signal supplied from the operation panel 2 is introduced into a main controller 80 including, for example, a microprocessor. The control signals generated from the main controller 80 are supplied to an A/D converter 70, a color encoder 72, a binary signal generator 74 and the memories 76-1 to 76-4. It should be noted that the control signals generated from a mechanical controller 82, which is connected to the main controller 80, are supplied to the scanner 8 and the picture image forming section 9 including the ink ribbons and the copying paper transfer section.

Figure 9A:
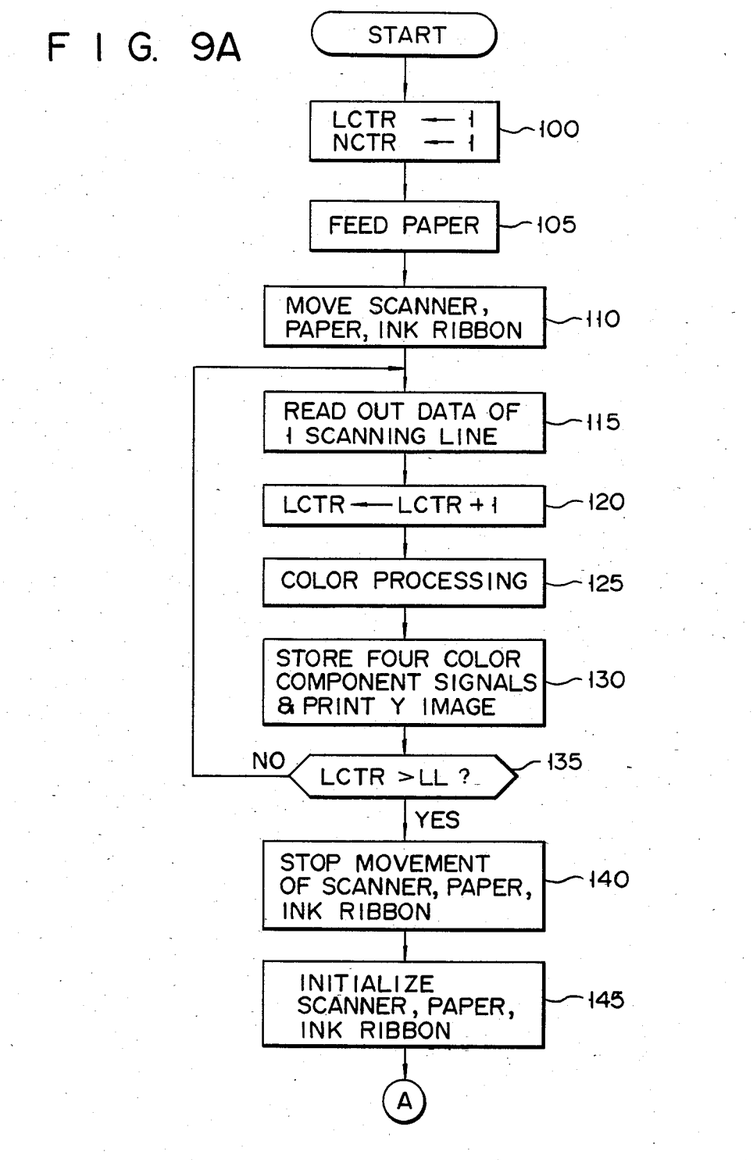
FIGS. 9A and 9B are flowcharts showing an example of the method of the present invention.
Figure 9B:
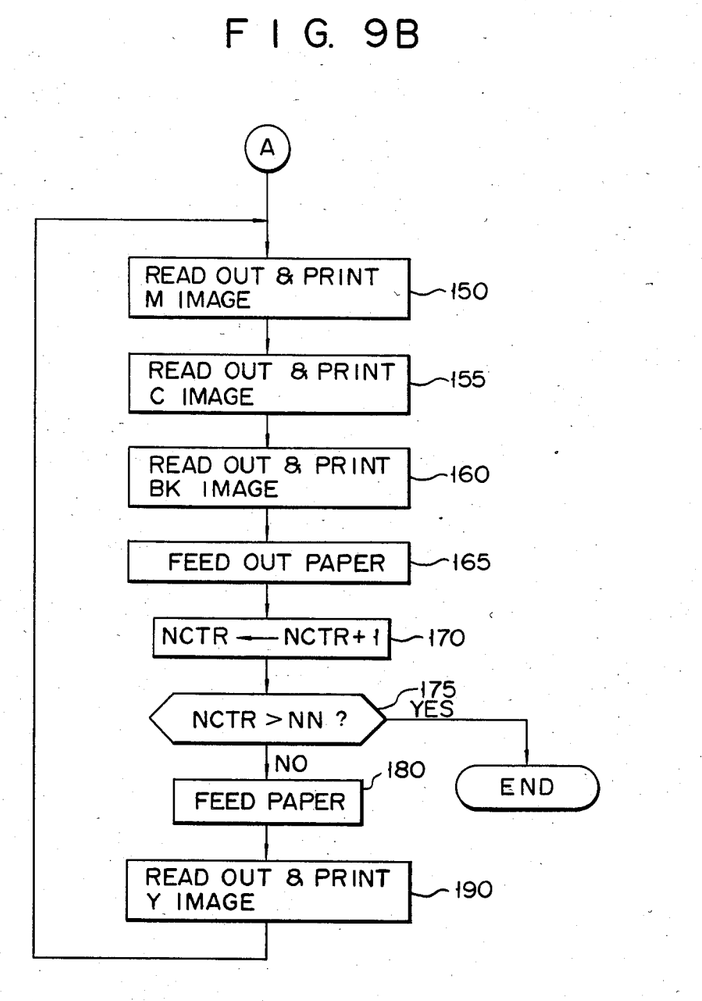

FIGS. 9A and 9B show flow charts illustrating the method of color copying according to the present invention. The operation is started by depressing the start key 3 of the operation panel 2. As shown in step 100, "1" is set in the line counter LCTR and in the copy number counter NCTR, bath counters are included in the microprocessor provided in the main controller 80. Then, a copying paper is fed so as to be held between the platen roller 30 and the thermal head 31, as shown in step 105, to make the apparatus ready for the copying operation. In step 110, the scanner 8 is moved along the document to start scanning and reading the document. At the same time, the copying paper and the ink ribbon are moved forward. In step 115, an image signal for one scanning line of the document is read out. Specifically, the outputs of the first and second photoelectric converters 13A and 13B are supplied to the A/D converter 70. When the image signal for one scanning line has been read out, the line counter LCTR is incremented by 1 as shown in step 120. In other words, the line counter LCTR denotes the number of scanned lines of the document. In step 125, the color component signals Y, G, C, generated from the A/D converter 70, are converted in the color encoder 72 into 4 color component signals Y, M, C and BK used for the thermal transfer.

In step 130, the four color component signals Y, M, C and BK are stored in the memories 76-1, 76-2, 76-3 and 76-4, respectively. At the same time, the Y color component signal is supplied to the head driver 78 with the result that a Y image of the first color is formed on the copying paper. Thus, the yellow color image is formed during the scanning process. The line counter is checked in step 135 to determine whether the document has been entirely scanned. Specifically, the line counter LCTR serves to check whether the total number LL of scanning lines, which LL represents the entire sheet of the document and is determined by the length of the document and the resolution of the copying machine, has been reached. If the number in the line counter LCTR is not larger than the total number LL, step 115 is executed again so as to read out the image signal for the next scanning line. If the number in the line counter LCTR is larger than LL, the scanner movement and transfer of the copying paper and ink ribbon are stopped, as shown in step 140, because image signals have been read from the entire document and an image in the first color has been formed and the four color component signals of the document have been stored.

In step 145, the copying paper is moved in the reverse direction, in preparation for the printing operation of the next color. As a result, the first scanning line of the copying paper is positioned between the thermal head 31 and the platen roller 30, and the scanner 8 is moved in the reverse direction so as to be brought back to the initial position. Also, the ink ribbon is slightly moved in the forward direction such that the ink region of the next color is moved to the position of the thermal head.

In step 150, the M color image signal is read out from the memory 76-2 and is supplied to the head driver 78 with the result that the M image is formed on the copying paper on which the Y color image was formed previously. In other words, the M color image is superposed on the Y color image. Upon completion of forming an image of one color, preparation for the printing operation of the next color is begun. This preparation consists of initializing the paper and ink ribbon, as discussed above in step 145, but this preparation is not shown in FIG. 9B. In step 155, the C image signal is read out from the memory 76-3 and is supplied to the head driver 78 with the result that the C color image is formed on the copying paper on which the Y and M color images were already formed. Likewise, the BK image signal is read out from the memory 76-4 and is supplied to the head driver 78 in step 160. As a result, the BK color image is formed on the copying paper on which the Y, M and C color images were already formed, so as to provide a desired full color copy. The color copy thus formed is discharged to the outside in step 165.

In step 170, the copy number counter NCTR is incremented by 1. The number counter and it is checked, in step 175, to determine whether or not the desired number of copies has been reached. Since the copy number counter NCTR is incremented by 1 every time one full color copy is formed, as described above, it suffices to check whether or not the number counter NCTR reaches the desired number NN of copies. If the number counter NCTR is not larger than the desired number NN, the next copying paper is fed, in step 180, to the region between the platen roller 30 and the thermal head 31. Further, in step 190, the Y image signal is read out from the memory 76-1 and is supplied to the head driver 78 so as to form the Y color image on the next copying paper. Then, step 150, i.e., the M color image formation, et seq. is executed again. Where the desired number NN has been detected by the copy number counter NCTR, in step 175, the copying operation is finished.

As described above, the image signal is read out from the document in the scanning step so as to store each color component signal and, at the same time, to form a color image of the first color in the embodiment. Also, the images of the second color et seq. and of the second copying paper et seq. are formed on the basis of the stored color component signals. Thus, the time required to form a full color copy can be markedly shortened in the present invention. Needless to say, the embodiment described above is effective in the case of making a single copy.

The apparatus and method described above covers the formation of a color image. Of course, the present invention can also be applied to a copying operation for making a plurality of monochromatic copies. In this case, an image is formed on the first copying paper and the image signal is stored in the memory during the scanning step. Also, the image formation on the second copying paper et seq. is performed on the basis of the stored signal.

The above description of the apparatus and method according to the present invention has been made with reference to a thermal transfer type copying machine. However, the present invention can also be applied to a copying machine of the wire dot type, the electro photographic type (e.g., a laser printer), or the ink jet type. Further, the present invention can be applied to facsimile machines as well as copying machines.

As described above, the first single color image is formed and the image signal is stored during the scanning step. Also, the image formation in the second full color copy et seq. is performed on the basis of the stored signal. It follows that the image forming apparatus and method of the present invention provides a way of efficiently forming full color images a plurality of times.

What is claimed is:

1. An image forming apparatus comprising:
   scanner means for optically scanning a document once and generating an image signal related to an image on said document said image signal including a plurality of color component signals;
   memory means for storing said image signal and providing a stored signal related to said image signal;
   image forming means for forming a first full color image on an image forming medium based on one of said plurality of color component signals and said stored signal; and
   image forming control means for supplying a first one of said color component signals to said image forming means for a first image formation simultaneously with said scanning, and for supplying the remaining color component signals only to said memory means to cause said stored signal to be supplied to said image forming means for a second and any subsequent image formations.

2. An apparatus according to claim 1, wherein said image forming means forms a full color image by superposing a predetermined number of single color images on a single image forming medium, and said control means supplies said first one of said plurality of color component signals to said image forming means to form a first one of said single color images, and supplies said remaining color component signals to said image forming means to form a second and any subsequent single color images.

3. An apparatus according to claim 2, wherein:
   said image signal contains at least two color components;
   said apparatus further includes color converting means for generating said plurality of color component signals corresponding to said color components; and
   all of said color component signals are stored in said memory means.

4. An apparatus according to claim 3, wherein said image signal contain three color components of yellow, green and cyan.

5. An apparatus according to claim 3, wherein said color converting means converts image signal into at least three color component signals.

6. An apparatus according to claim 5, wherein said color converting means converts said image signal into four color component signals of yellow, magenta, cyan and black.

7. An apparatus according to claim 2, wherein said image forming means forms the same full color image on a plurality of image forming media, and said control means supplies said first one of said plurality of color component signals to said image forming means to form said first single color image on a first one of said plurality of image forming media, and supplies said remaining color component signals to said image forming means to form said second and any subsequent single color images on said first image forming medium, and supplies said stored signal to said image forming means to form all of said single color images for a second and any subsequent ones of said plurality of image forming media.

8. An apparatus according to claim 7, wherein:
   said image signal contains at least two color components;
   said apparatus further includes color converting means for generating said plurality of color component signals corresponding to said color components; and
   all of said color component signals are stored in said memory means.

9. An apparatus according to claim 8, wherein said image signal contains three color components of yellow, green and cyan.

10. An apparatus according to claim 8, wherein said color converting means converts said image signal into at least three color component signals.

11. An apparatus according to claim 10, wherein said color converting means converts said image signal into four color component signals of yellow, magenta, cyan and black.

12. An apparatus according to claim 1, wherein said image forming means is a printer of the thermal transfer type.

13. An apparatus according to claim 1, wherein said image forming means is a printer of the wire-dot type.

14. An apparatus according to claim 1, wherein said image forming means is a printer of the electrophotographic type.

15. An apparatus according to claim 1, wherein said image forming means is a printer of the ink-jet type.

16. A method of forming an image comprising the steps:
   scanning a document once and producing an image signal related to an image on said document, said image signal including a plurality of color component signals;
   storing said image signal and producing a stored signal related to said image signal;
   forming an image on a first of a plurality of image forming media based on a first one of said plurality of color component signals provided from said scanning step, simultaneously with said scanning, remaing ones of said plurality of color component signals being provided only to said storing step; and
   forming the same image on at least a second of said plurality of image forming media based on said stored signal.

17. A method according to claim 16 wherein said image signal contains at least two color components, and said method includes a further step of converting said image signal into at least two color component signals, said storing step including storing said color component signals and producing stored color signals related thereto, said image forming steps including forming full color images by superposing a plurality of single color images on each one of said plurality of image forming media, said first medium image forming step including supplying a first one of said color component signals to form a first one of said single color images on said first one of said plurality of image forming media and supplying said stored color signals to form second and any other single color images on said first image forming medium, and said second medium image forming step supplying said stored signals to form all of said single color images on a second and any other of said plurality of image forming media.

18. A color image forming apparatus comprising:

scanner means adapted for optically scanning an image on a document, and for providing a plurality of color component signals related to said document image;

memory means for storing said plurality of color component signals;

image forming means for forming at least a first full color image of said document image by sequentially overlapping a plurality of single color images on an image forming medium, each single color image formed from one of said plurality of color component signals; and image formation control means for causing said scanner means to supply a first one of said plurality of color component signals to said memory means and to said image forming means to cause said image forming means to form a first one of said single color images simultaneously with said scanning, and for causing said scanner means to supply the remaining color component signals only to said memory means to cause said image forming means to form the remaining single color images from the color component signals stored in said memory means, and for causing said image forming means to form any subsequent full color images from all of the color component signals stored in said memory means.

* * * * *